United States Patent [19]

Liron et al.

[11] Patent Number: 5,440,591
[45] Date of Patent: Aug. 8, 1995

[54] SWITCHING APPARATUS FOR DIGITAL SIGNALS

[75] Inventors: John E. Liron, Grass Valley, Calif.; Leon J. Stanger, Farmington, Utah

[73] Assignee: The Grass Valley Group, Inc., Nevada City, Calif.

[21] Appl. No.: 866,703

[22] Filed: Apr. 10, 1992

[51] Int. Cl.[6] ............................................. H04L 4/00
[52] U.S. Cl. .................................... 375/354; 370/108; 340/825.2; 340/825.79
[58] Field of Search ............ 375/106; 370/108, 105.4, 370/100.1; 340/825.2, 825.79; 307/269, 590; 348/705

[56] References Cited

U.S. PATENT DOCUMENTS

| | | | |
|---|---|---|---|
| 4,352,181 | 9/1982 | Le Dieu et al. | 370/108 |
| 4,472,802 | 9/1984 | Pin et al. | 370/106 |
| 4,774,705 | 9/1988 | Eaves, Jr. | 370/108 |
| 4,775,987 | 10/1988 | Miller | 371/1 |
| 4,797,589 | 1/1989 | Collins | 370/63 |

Primary Examiner—Stephen Chin
Assistant Examiner—T. Ghebretinsae
Attorney, Agent, or Firm—Francis I. Gray

[57] ABSTRACT

A circuit for preserving a predetermined timing relationship between a synchronization signal including periodic sync codes and a digital signal composed of successive frames of which the nominal duration is equal to the period of the sync codes includes a delay device connected to receive the digital signal. The delay device is selectively adjustable to impose a controllable delay on propagation of the digital signal. A FAW detector detects a frame alignment word in the digital signal, and a time measurement circuit measures the time that elapses between occurrence of a sync code and detection of a frame alignment word. A delay adjustment circuit is responsive to the time measurement circuit to adjust the delay imposed by the delay device.

12 Claims, 4 Drawing Sheets

SWITCHING APPARATUS FOR DIGITAL SIGNALS

BACKGROUND OF THE INVENTION

This invention relates to switching apparatus for digital signals.

In a video production facility, it is known to route video signals from signal sources, such as cameras, VTRs etc., to signal receivers, such as video effects devices; monitors and VTRs using an n×m switching matrix having a set of n input terminals connected to respective signal sources and a set of m output terminals connected to respective signal receivers. The switching matrix can be configured so that any one of the n input terminals can be connected to any subset of the m output terminals, including a single output terminal. In this fashion, a video signal received at input terminal A, for example, can be distributed to all the receivers connected to the specified subset of output terminals. If, then, it is desired to connect input terminal B, which receives a different video signal, to the subset of output terminals, the configuration of the matrix can be changed so that input terminal B is connected to the subset of output terminals in lieu of input terminal A.

If a switching matrix switches from selecting input terminal A to selecting input terminal B, but the two video signals provided by the sources connected to those terminals are not synchronous, the synchronization circuits of the receivers connected to the output terminals might not lock immediately to the new video signal. In the case of the receiver being a monitor, the temporary loss of synchronization might be manifested by a rolling or jumping of the picture displayed on the monitor. In order to alleviate this problem, it is conventional to maintain tight synchronism between video signals received at the input terminals of a switching matrix. In a conventional switching matrix, it is usual to maintain the input signals in synchronism to within one degree of the subcarrier cycle, or about 700 ps. Because of differences in path length through the matrix, previously it has also been necessary to synchronize propagation of signals through the core of the switching matrix.

Video switchers are designed to keep track of the instantaneous location in the video frame of the signal passing through the switcher. This enables the switcher always to switch in the vertical interval of the video signal, so as to minimize visual disturbance to the viewer of a display based on the video signal. In switchers designed for use with signals in the NTSC system, switching normally takes place during line 10 of the video frame. The constraints that are imposed on relative timing of the video signals and on the timing of the switching operation ensure that the degradation of the video signal on a switch is kept quite small.

It is common to distribute video signals in a production facility in serial digital form. In a known serial digital video format, the composite analog video signal is sampled at a frequency of 14.3 MHz so that each video line is resolved into 910 samples, 768 of which occur during the active interval. Each sample value is quantized to ten bits, so that the bit rate is 143 Mbits/s. A frame alignment word (FAW) is inserted at the end of the active interval of each video line of the serial digital composite video signal, each serial digital video line being a data frame of a nominal duration. The FAW, which is known as the timing reference signal (TRS), may be a sequence of bits that cannot occur, or is very unlikely to occur, in ten-bit digital composite video, and may be a 40-bit sequence.

In a serial digital composite video signal, the TRS occurs at the same frequency as the horizontal sync pulse in an analog video signal. If the TRS occurs too early or too late relative to the previous TRS, the display provided by the signal is degraded. In order to perform a synchronous switch between two serial digital composite video signals, it is necessary that the interval between successive TRS's of the output signal remain constant. This implies that the relative timing difference of the signals being switched must be constrained to a time not exceeding one quarter of the bit period. For serial digital composite video signals, this corresponds to a time of from 900 to 1750 picoseconds.

Previous methods of maintaining proper timing of analog video signals or parallel digital video signals at the output of a switching matrix have involved adjusting the timing at the input terminals of the switching matrix in order to achieve bit synchronicity at the inputs, but with high speed signals the variations in path lengths through the matrix can introduce delay differences that are not acceptable.

SUMMARY OF THE INVENTION

The present invention allows relaxation of the requirement for tight synchronism of digital signals at the inputs of a switching matrix and on propagation through the matrix while maintaining tight synchronization at the output. In the preferred embodiment of the invention, it is sufficient for digital video signals received at the output of the switching matrix from a given input to be synchronized to within H of an external timing reference, where H is the period of the horizontal sync signal.

In accordance with a first aspect of the present invention, switching apparatus comprises a switch having at least first and second input terminals for receiving respective data signals each composed of successive frames of nominally uniform duration, at least one output terminal, and means for selectively connecting either the first input terminal or the second input terminal to the output terminal. The apparatus also comprises a timing circuit having an input terminal connected to the output terminal of the switch and also having an output terminal. The timing circuit is operative to propagate a data signal received at its input terminal to its output terminal and is responsive to a data signal present at its input terminal to impose a delay on propagation of that signal to its output terminal such that the data signal at the output terminal of the timing circuit maintains a substantially uniform frame rate.

In accordance with a second aspect of the invention, a circuit for preserving a predetermined timing relationship between a synchronization signal including periodic occurrences of a sync code and a digital signal composed of successive frames of which the nominal duration is equal to the period of the sync code, each frame including a frame alignment word, comprises delay means connected to receive the digital signal, the delay means being selectively adjustable to impose a controllable delay on propagation of the digital signal through the delay means, FAW detection means for detecting a frame alignment word in the digital signal, time measurement means for measuring the time that elapses between occurrence of a sync code and detection of a frame alignment word by the FAW detection means, and delay adjustment means responsive to the time measurement means to adjust the delay imposed by the delay means.

In accordance with a third aspect of the invention, a circuit for selectively delaying a digital signal composed of successive frames of nominally uniform duration, each frame including a frame alignment word, comprises delay means connected to receive the digital signal, the delay means being selectively adjustable to impose a controllable delay on propagation of the digital signal through the delay means, FAW detection means for detecting occurrence of a frame alignment word in the digital signal applied to the delay means, time measurement means for measuring the time that elapses following occurrence of a first frame alignment word until detection of a second frame alignment word by the FAW detection means, and delay adjustment means responsive to the time measurement means to adjust the delay imposed by the delay means.

BRIEF DESCRIPTION OF THE DRAWINGS

For a better understanding of the invention, and to show how the same may be carried into effect, reference will now be made by way of example, to the accompanying drawings, in which.

Figure 1:
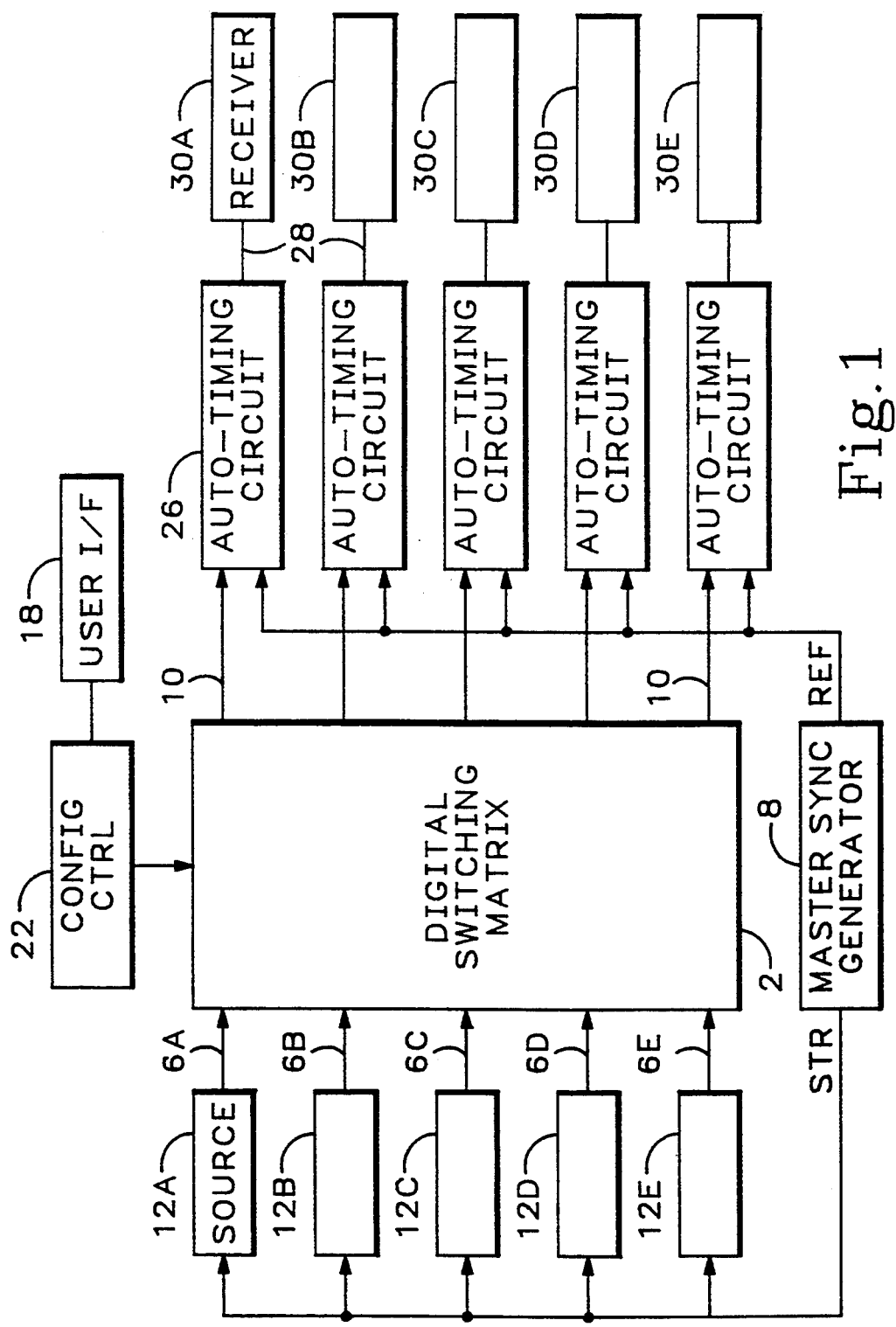
FIG. 1 is a block diagram of switching apparatus embodying the invention.

The circuits are illustrated in the drawings in simplified form. Accordingly, certain routine features, the need for which will be evident to persons skilled in the art, such as delays to ensure that logic signals are properly timed, are not shown.

DETAILED DESCRIPTION

The switching apparatus shown in FIG. 1 comprises an n×m switching matrix 2 having a set of n input terminals 6A-6E and a set of m output terminals 10. FIG. 1 shows five input terminals and five output terminals, but this is purely by way of example, since the switching matrix could have many more than five input terminals and many more than five output terminals.

FIG. 1 also shows a master sync generator 8, which generates an external reference (REF). The external reference has a clock rate of 143 MHz and includes a timing reference signal (TRS). The TRS occurs at a frequency of about 15.7 kHz and is composed of a 40-bit sequence. The external reference is the "house sync", which serves as a timing reference throughout the production facility in which the switching apparatus is installed. The master sync generator 8 also produces a source timing reference (STR) which is the same as the external reference but is advanced in time relative to the external reference by a predetermined interval $\tau$. The source timing reference is applied to the video signal sources 12A-12E and each produces a composite video signal in serial digital form. The active interval of each horizontal line contains 768 data words each of ten bits. In the inactive interval between each two consecutive active intervals is a TRS. The video signals are produced by the sources 12A-12E with zero delay relative to the source timing reference. Therefore, at each source 12 the TRS of the video signal coincides with the TRS of the source timing reference. The video signals produced by the sources 12A-12E are applied to the input terminals 6A-6E respectively of the switching matrix 2.

A user interface 18 generates commands that select an input terminal 6 and specify a subset of output terminals 10. A configuration controller 22 is responsive to the commands provided by user interface 18 to configure the switching matrix so that it connects the selected input terminal to the specified subset of output terminals. The video signal provided by the selected signal source is distributed to the subset of output terminals 10, and accordingly the video signal is received at each output terminal. The user interface may subsequently generate a command that selects a different input terminal for connection to the specified subset of output terminals. Controller 22 responds to such a command by reconfiguring the switching matrix at the start of line 10 of the video frame so that it connects the new input terminal to the specified subset of output terminals.

The output terminals 10 are connected through respective auto-timing circuits 26 to terminals 28, which are connected to respective receivers 30. Each circuit 26 propagates a signal received at terminal 10 to terminal 28, while imposing a controlled delay on the signal. For the purpose of the following discussion, it will be assumed that the propagation delay from the signal sources 12 to the output terminals 10 of the switching matrix (i.e. the delay due to cable length and other factors, including delay in the switching matrix) ranges from $t_{min}$ to $t_{max}$ and has a mean value of $t_m$, and that the distribution of the delays is such that $t_m = (t_{max} + t_{min})/2$. It will also be assumed that $(t_{max} - t_{min}) = H$ and that $\tau$ is equal to $t_m + H/2$.

The external reference (REF) is applied to the auto-timing circuits, and it will be assumed that the cable propagation delay between the master sync generator and the auto-timing circuits is negligible. Therefore, the TRS at the end of a given line of the video signal generated by the source 12A, for example, will reach any selected output terminal 10 of the switching matrix within an interval from 0 to H before the corresponding TRS of the external reference reaches the auto-timing circuits. However, the video signal received at a particular output terminal 10 is not timed with respect to a system clock.

Figure 2:
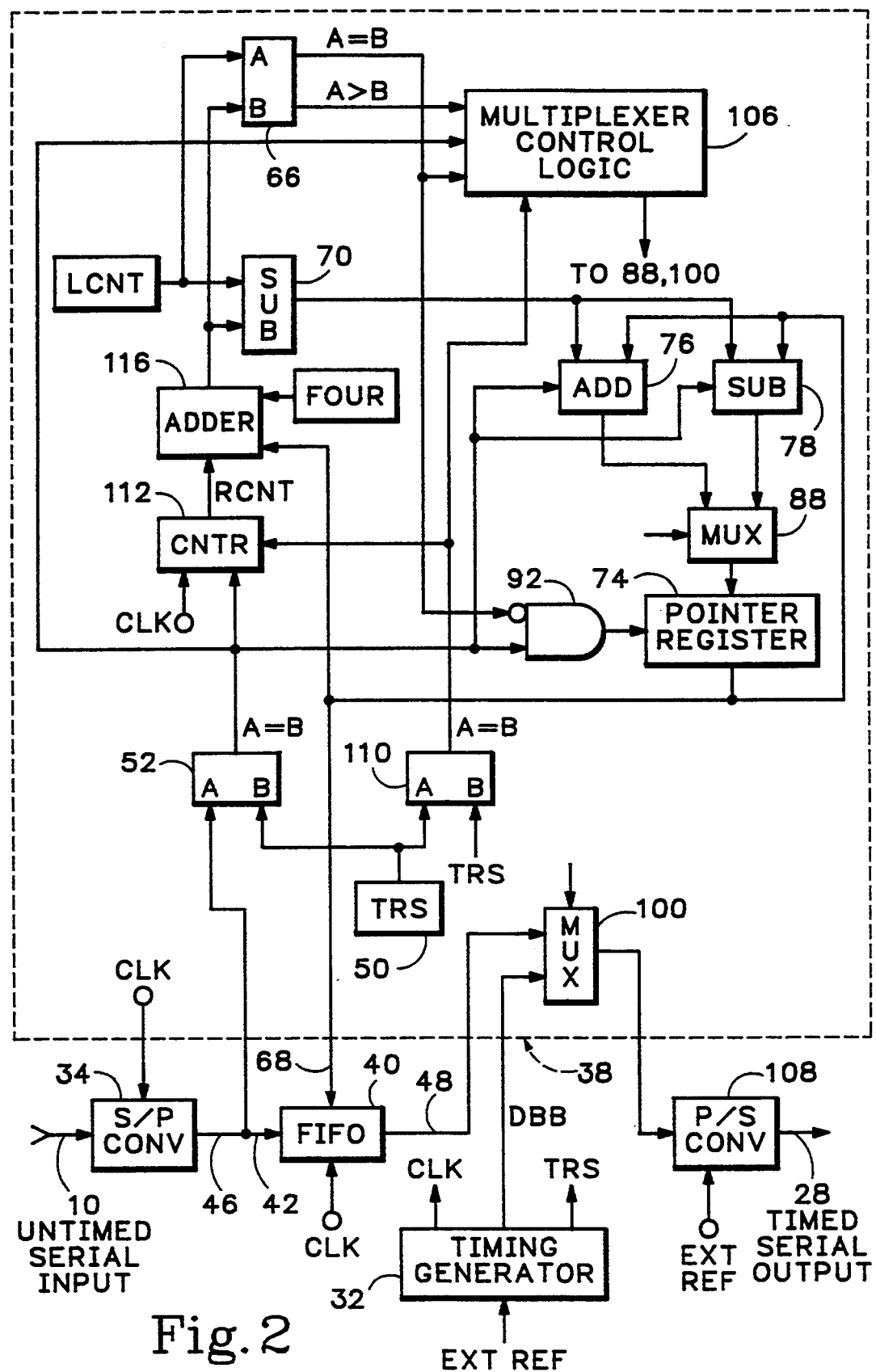
FIG. 2 is a block diagram of an auto-timing circuit that forms part of the FIG. 1 switching apparatus.

Referring to FIG. 2, which illustrates one of the auto-timing circuits 26 in greater detail, the external reference is applied to a timing generator 32, which generates a 14.3 MHz pixel clock signal CLK and a digital black burst signal DBB, which contains TRS and blanking. The pixel clock signal CLK and the digital black burst signal DBB are timed relative to the external reference. The timing generator also provides a reference TRS signal TRS that contains the TRS coincident with the TRS of the external reference.

The untimed serial digital video signal received by the auto-timing circuit is applied to a serial-to-parallel converter 34. The serial-to-parallel converter includes a clock recovery circuit (not shown) which recovers clock information from the untimed serial digital video signal and uses that clock information to acquire the ten-bit serial words that form the serial digital video signal. The ten-bit data words, including video and TRS, are placed in parallel form on a ten-bit wide data bus 46 under control of the pixel clock signal CLK. The data bus 46 is connected to an input port 42 of a line delay 40. The data words are loaded sequentially into the line delay 40, which delays the video signal received at its input port by a selected amount and outputs the delayed video signal at an output port 48. The line delay functions as a variable length FIFO shift register having 910×10 storage locations through which a data word is progressively stepped in response to the pixel clock. The output port of the line delay can tap any one of the line delay's storage locations in response to a pointer received at a pointer input 68. Such line delays are commercially available. The output port of the line delay is connected to one input of a multiplexer 100, whose second input receives the digital black burst signal DBB from the timing generator 32. The output of multiplexer 100 is connected through a parallel-to-serial converter 108 to terminal 28. Preferably, the parallel-to-serial converter 108 operates in response to the external reference in order to avoid introduction of timing errors.

The untimed parallel video signal is also applied to a timing control circuit 38, which controls the amount by which the line delay delays the video signal. The timing control circuit 38 includes a pointer register 74 which stores a number POINTER. The output of the pointer register 74 is connected to the pointer input 68 of line delay 40. Therefore, the current pointer stored in register 74 selects the location in the line delay that is tapped by output port 48 and thus controls the delay imposed by the line delay.

The timing control circuit 38 also comprises a counter 112 which counts the pixel clocks provided by the timing generator 32. A comparator 52 detects when a TRS is received on the input data bus 46 by comparing each sequence of four data words on bus 46 with the output of a local TRS pattern source 50 which generates the four ten-bit words that correspond to the 40-bit sequence of the TRS. Comparator 52 asserts a logical one output if a TRS is received on bus 46. The output of comparator 52 is connected to one input of an AND gate 92, enable inputs of an adder 76 and a subtractor 78, an input of multiplexer control logic 106, and the stop input of the counter 112.

The reference TRS signal TRS provided by the timing generator 32 and the TRS pattern (in serial form) are applied to a comparator 110 whose output is asserted when a reference TRS is detected. The counter 112 is reset each time the output of comparator 110 is asserted. Therefore, the counter 112 counts the number of clock pulses (RCNT) since the occurrence of the previous reference TRS.

If the propagation delay in the multiplexer 100 is one clock period and the delay in the parallel-to-serial converter 108 is three clock periods, a data TRS will arrive at the output terminal 28 (POINTER plus FOUR) clock periods after it is detected on the bus 46.

The output of counter 112 is applied to one input of adder 116, which also receives the constant FOUR and the number POINTER stored in the pointer register 74 and thus provides the output (RCNT plus POINTER plus FOUR). The output of adder 116 is applied to one input of a subtractor 70, which receives the number LCNT (the number of data words in one line of the video signal, i.e., 910 in the case of the example) at its other input. Subtractor 70 subtracts (RCNT plus POINTER plus FOUR) from LCNT and provides the absolute value of the result. A comparator 66 compares the number LCNT (input A) with (RCNT plus POINTER plus FOUR). Comparator 66 has A=B and A>B outputs connected to multiplexer control logic 106. The A=B output of comparator 66 is also connected to a negated input of the AND gate 92.

The adder 76 and subtractor 78 each receive as inputs both the number POINTER stored in pointer register 74 and the output of subtractor 70. The outputs of adder 76 and subtractor 78 are connected to respective inputs of a multiplexer 88. The output of multiplexer 88 is applied to pointer register 74, which is loaded in response to the output of AND gate 92. AND gate 92 asserts a one output in response to a one output of comparator 52 if the A=B output of comparator 66 is logical zero. Thus, the output of adder 76 or subtractor 78 is loaded into pointer register 74 when a data TRS is detected, unless the data TRS was detected when (RCNT plus POINTER plus FOUR) was equal to LCNT, in which case the number stored in pointer register 74 remains unchanged.

The multiplexer control logic 106 controls the states of multiplexers 88 and 100 in response to its various inputs. Multiplexer control logic 106 has three possible modes of operation, which will be considered in turn.

The apparatus is initialized by setting POINTER equal to 455 for a data TRS that coincides with the corresponding reference TRS. This may be accomplished by switching the reference TRS signal to the A input of the comparator 52 and loading 455 into the pointer register 74. Thereafter, if a data TRS is detected by comparator 52 when the count RCNT accumulated in counter 112 is equal to (LCNT minus POINTER minus FOUR), so that the output of adder 116 is LCNT, the data TRS is considered on time. The A=B output of comparator 66 is logical one and the A>B output is logical zero when the output of comparator 52 is asserted. In this case, multiplexer 100 selects line delay 40. The A=B output of comparator 66 prevents loading of a new pointer value into pointer register 74 and accordingly the current pointer value remains unchanged. The data TRS will reach the output 28 when the count in counter 112 reaches LCNT, i.e. when the number of clock periods since detection of the previous reference TRS is equal to LCNT, or 910 in the case of the example. Thus, the data TRS will be present at the output 28 simultaneously with the occurrence of the next reference TRS.

If a data TRS is detected by comparator 52 when the count in counter 112 is less than (LCNT minus POINTER minus FOUR), the data TRS is considered early, since it would reach output 28 before the count reached LCNT unless POINTER were adjusted. In response to the output of comparator 52, the output of subtractor 70 is loaded into adder 76 and subtractor 78. Multiplexer 88 selects adder 76, and accordingly a new pointer equal to the old pointer plus a number representative of the amount by which the data TRS is early is loaded into the pointer register 74. For example, if POINTER is 400 and the data TRS is detected when the count accumulated in the counter 112 is 420, the data TRS would reach output 28 when the count was 824 unless POINTER were adjusted. The output of adder 116 (824) is subtracted from LCNT (910) and the result (86) is added to the current pointer value (400) to derive the new pointer value (486). The data TRS will reach the output 28 490 clock periods later, when the count in counter 112 reaches 910.

Figure 3:
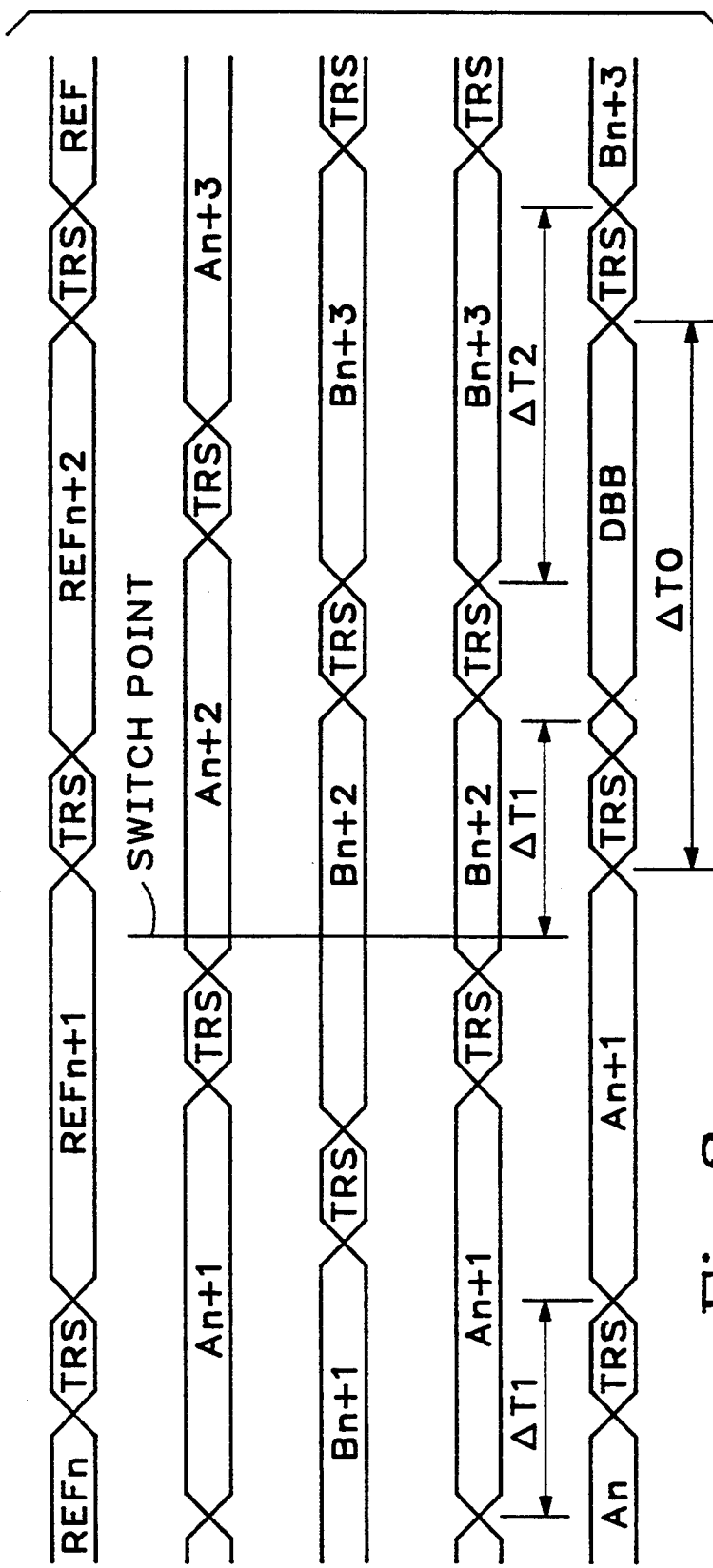
FIG. 3 is a timing diagram illustrating one mode of operation of the switching apparatus.

FIG. 3 illustrates this manner of operation of the auto-timing circuit. In FIG. 3, the top trace represents the external reference and the next two traces represent the video signals received at the input terminals 6A and 6B of the matrix. In these three signals, the TRS's occur at the proper interval ΔT0. The fourth trace in FIG. 3 represents the signal at an output terminal of the matrix, ignoring delays in the matrix, where a switch from input terminal A to input terminal B takes place at the switchpoint shown. The bottom trace in FIG. 3 represents the output that the auto-timing circuit provides where ΔT1 represents the delay in the auto-timing circuit before the switch and ΔT2 represents the delay in the auto-timing circuit after the switch. It will be seen that the change in delay preserves the proper interval ΔT0 between TRS's. The bottom trace in FIG. 3 shows that multiplexer 100 selects the digital black burst signal from the time that the switch takes place until the time that the data TRS of the signal received at terminal B is present at the output of line delay 40, i.e. eight clock periods before the output of counter 112 reaches 910. This avoids the possibility of an anomalous sequence occurring at the output 28.

If the output of adder 116 reaches LCNT before a data TRS is detected, the data TRS is considered late, since the data TRS would be unable to reach output 28 until after the output of counter 112 reaches LCNT unless POINTER were adjusted. For example, if POINTER is 600 and the data TRS is detected when the count in counter 112 is 350, the data TRS would reach output 28 at a count of 954 (but for resetting of counter 112) and therefore the data TRS is 44 clock periods late. When the data TRS is detected, the output of subtractor 70 is loaded into adder 76 and subtractor 78, and multiplexer 88 selects subtractor 78. The output of subtractor 70 represents the amount by which the data TRS is late, and subtractor 78 subtracts this number from the current pointer value, and the delay imposed by line delay 40 is reduced accordingly. In order to avoid an anomalous sequence, multiplexer 100 selects the digital black burst signal from the time that the pointer is changed until RCNT is equal to LCNT minus 8. In this fashion, the locally produced TRS will reach output 28 during the interval from RCNT=LCNT−3 until RCNT=LCNT.

Figure 4:
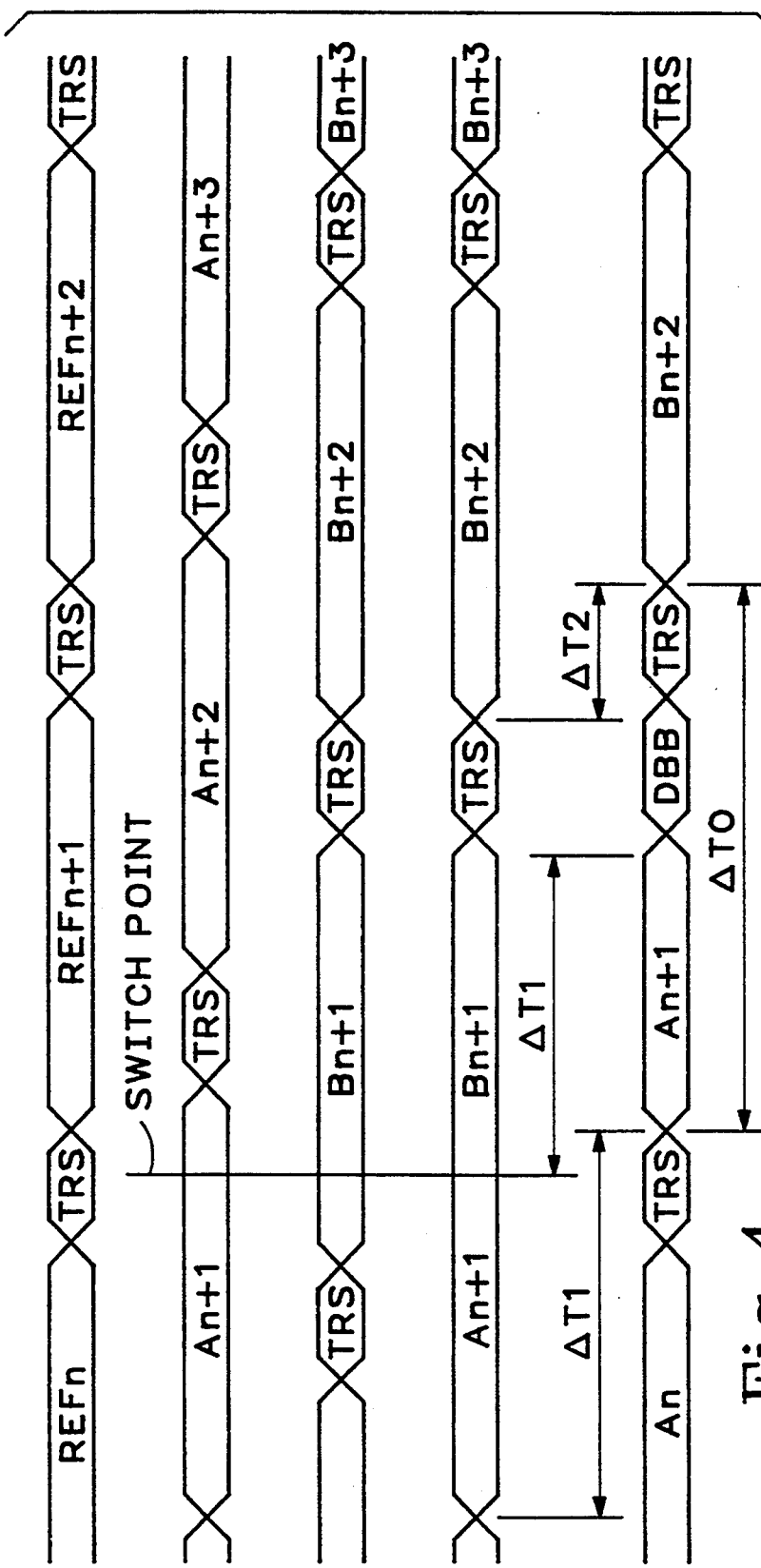
FIG. 4 is a timing diagram illustrating a second mode of operation of the switching apparatus.

FIG. 4 illustrates this manner of operation of the auto-timing circuit. In FIG. 4, the different traces represent the signals at the same points as are referred to in connection with FIG. 3.

It will therefore be seen that whether the data TRS on bus 46 is early, on time, or late, the signal at the output terminal of circuit 26 observes the framing rules of the signal format. Further, the output video signals are synchronized relative to the external timing reference, and so drift is avoided.

It will be appreciated that the invention is not restricted to the particular embodiment that has been described, and that variations may be made therein without departing from the scope of the invention as defined in the appended claims and equivalents thereof. For example, although it is preferred that the timing of the data TRS should be examined and, if necessary, corrected during each line of the video signal, it would be possible to examine the data TRS only during the vertical interval, or only after a switch has taken place in the switching matrix. Moreover, the timing reference might not originate from an external source but from one of the video signals, for example the output of the auto-timing circuit.

In the described embodiments, the maximum correction range is limited to ±H/2 because the auto-timing circuit cannot distinguish between lines of the digital video signal. A timing error greater than ±H/2 will cause the system to lock one line out of phase. If the TRS has a line identification number associated with it, indicating the number of the current line, the line identification number can be decoded to avoid ambiguity due to excess timing errors. In this way, the correction range can be extended to multiple horizontal lines. However this is generally unnecessary because the errors to be corrected due to differences in path length through the switching matrix and/or differences in timing of the inputs to the matrix are usually small.

It is stated above that the sources 12A–12F produce video signals that have zero delay relative to the source timing reference. This statement is valid for television cameras and video tape recorders. However, other video signal sources generate video signals that would be delayed relative to the source timing reference, and this delay would need to be accommodated by increasing the advancement of the source timing reference.

Although the invention has been described with reference to a composite digital video signal, the invention is also applicable to digital video signals in other formats. For example, the invention may be applied to timing a component digital video signal, in which there is a frame alignment word both at the end of each active video interval and at the start of each active video interval. A component signal is subject to more rigorous requirements than a composite signal because the data structure of the component signal is much more complex, but the principle whereby timing error is removed is the same. Further, the invention is applicable to digital signals other than video signals. The auto-timing circuit shown in FIG. 2 is implemented in parallel form because this has practical advantages with respect to clock rates. However, the auto-timing circuit may alternatively be implemented in serial form.

We claim:

1. Switching apparatus for coupling a source to a receiver comprising:

a switch having at least first and second input terminals for receiving respective data signals from the source, each data signal composed of successive frames of nominally uniform duration, at least one output terminal, and means for selectively connecting either the first input terminal or the second input terminal to the output terminal, and a timing circuit having an input terminal connected to said output terminal and also having an output terminal coupled to the receiver, the timing circuit being operative to propagate a data signal received at its input terminal to its output terminal and being responsive to an external reference signal to impose a delay on propagation of the data signal to its output terminal such that the signal at the output terminal of the timing circuit is timed with respect to the external reference signal.

2. Apparatus according to claim 1, wherein the timing circuit comprises delay control means for detecting a frame alignment word representative of an end of a frame of the data signal received by the timing circuit and determining whether the frame alignment word has occurred within a predetermined range of times relative to a preceding frame alignment word and, if not, providing a delay signal, and delay means for selectively imposing a delay on the propagation of the data signal to the output terminal of the timing circuit in response to said delay signal.

3. Apparatus according to claim 2, wherein the delay means comprises a tapped first-in, first-out shift register and a pointer register for storing a pointer word for selecting a tap as an output of the shift register.

4. Apparatus according to claim 3, wherein the delay control means comprises means for generating a pointer offset word representative of the difference between the time of occurrence of the frame alignment word and the expected time of occurrence of a timing reference word, and means for additively combining the pointer offset word with the pointer word stored in the pointer register to generate a new pointer word and for loading the new pointer word into the pointer register.

5. Apparatus according to claim 1, wherein the timing circuit comprises means for detecting a frame alignment word representative of an end of a frame of the data signal and determining whether the frame alignment word has occurred within a predetermined range of times relative to a preceding frame alignment word of a timing reference signal and, if not, providing a delay adjustment signal, a delay circuit for selectively imposing a delay on the propagation of the data signal to the output terminal of the timing circuit, and means for adjusting the delay imposed by the delay circuit in response to the delay adjustment signal.

6. Apparatus according to claim 1, wherein the switch has multiple output terminals and is operative selectively to connect the first input terminal or the second input terminal to a subset of the output terminals, and the apparatus also comprises a plurality of timing circuits connected to said output terminals respectively.

7. A circuit for preserving a predetermined timing relationship between a synchronization signal including periodic sync codes and a digital signal composed of successive frames of which the nominal duration is equal to the period of the sync codes, each frame including a frame alignment word, said circuit comprising:

delay means connected to receive the digital signal, the delay means being selectively adjustable to impose a controllable delay on propagation of the digital signal through the delay means, FAW detection means for detecting a frame alignment word in the digital signal, time measurement means for measuring the time that elapses between occurrence of a sync code and detection of a frame alignment word by the FAW detection means, and delay adjustment means responsive to the time measurement means to adjust the delay imposed by the delay means.

8. A circuit according to claim 7, wherein the delay means comprise a tapped first-in, first-out shift register and a pointer register for storing a pointer word for selecting a tap as the output of the shift register.

9. A circuit according to claim 8, wherein time measurement means generate a pointer offset word, and the delay adjustment means are operative to combine the pointer offset word additively with the pointer word stored in the pointer register to generate a new pointer word and load the new pointer word into the pointer register.

10. A circuit for selectively delaying a digital signal composed of successive frames of nominally uniform duration, each frame including a frame alignment word, said circuit comprising:

delay means connected to receive the digital signal, the delay means being selectively adjustable to impose a controllable delay on propagation of the digital signal through the delay means, FAW detection means for detecting occurrence of a frame alignment word in the digital signal applied to the delay means, time measurement means for measuring the time that elapses following occurrence of a first frame alignment word until detection of a succeeding frame alignment word by the FAW detection means, and delay adjustment means responsive to the time measurement means to adjust the delay imposed by the delay means.

11. A circuit according to claim 10, wherein the delay means comprise a tapped first-in, first-out shift register and a pointer register for storing a pointer word for selecting a tap as the output of the shift register.

12. A circuit according to claim 11, wherein the time measurement means generate a pointer offset word, and the delay adjustment means are operative to combine the pointer offset word additively with the pointer word stored in the pointer register to generate a new pointer word and load the new pointer word into the pointer register.

* * * * *